March 11, 1947. F. RAFFLES 2,417,175
METHOD OF MAKING LAMINATED PUNCHED PLYWOOD ASSEMBLIES
Filed Oct. 9, 1944
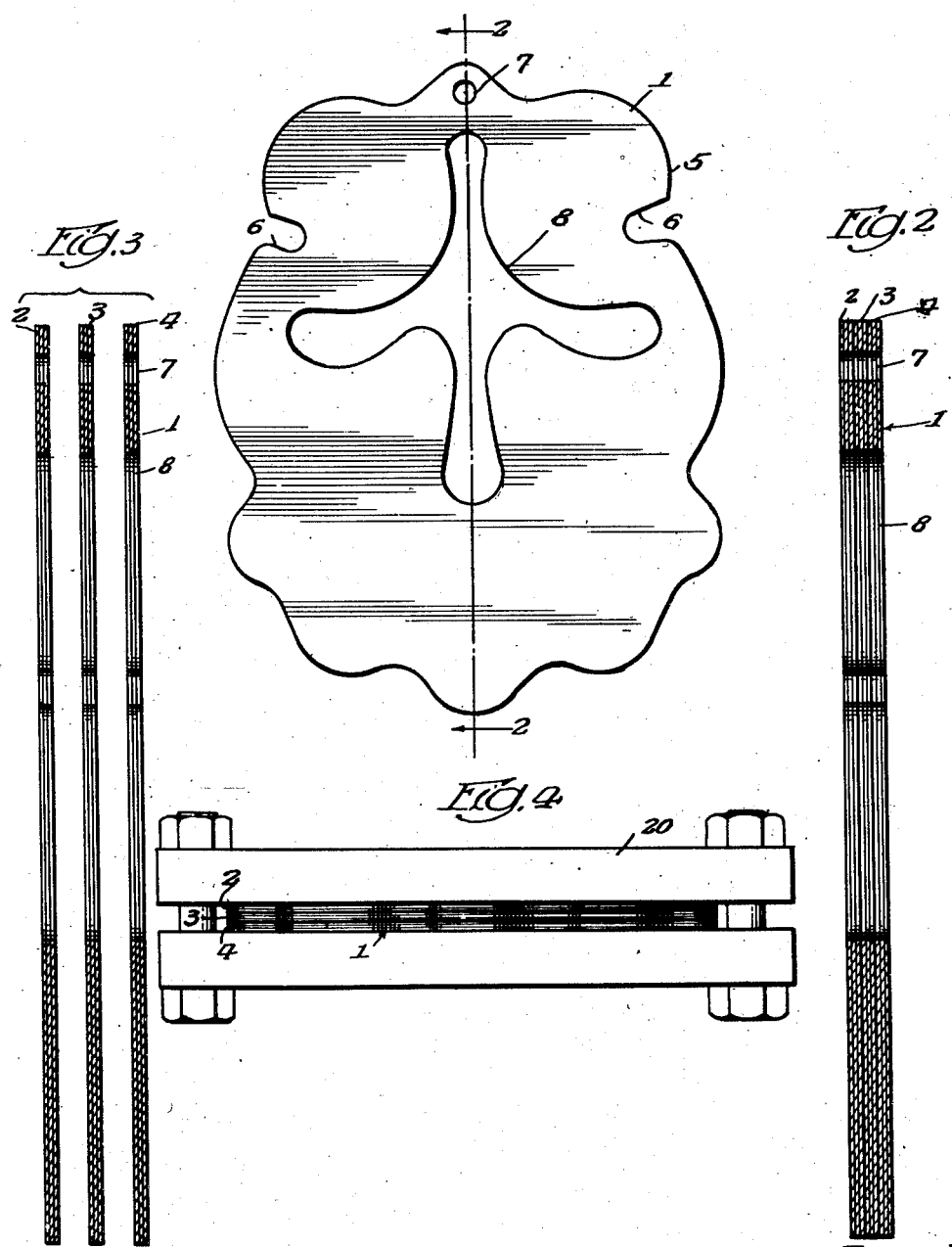
Inventor
Frank Raffles
By: Morris Spector, atty.

Patented Mar. 11, 1947

2,417,175

UNITED STATES PATENT OFFICE 2,417,175

METHOD OF MAKING LAMINATED PUNCHED PLYWOOD ASSEMBLIES

Frank Raffles, Chicago, Ill.

Application October 9, 1944, Serial No. 557,901

2 Claims. (Cl. 144—309)

This invention relates to ornamental flat plywood structures, particularly boards, discs or the like which are cut along the periphery or throughout the body thereof along desired outlines, to produce particular ornamental effects.

It is often desired to provide a flat board of an irregular shaped outline and having perforations extending therethrough, which perforations may be of regular or irregular shapes. In the past this has been done by cutting a flat board with a saw, generally a jig saw or a router, along the outline or outlines desired. Such cutting operations are expensive. Comparatively thick wooden objects cannot be stamped or die cut to shape. Also, there are limits as to minimum dimensions of holes that may be stamped through a wooden block, those dimensions being correlated with the thickness of the block being stamped. As a general rule the diameter of a hole being stamped in a wooden object should not be less than the thickness of the object. It is one of the purposes of the present invention to provide a process for making stamped wooden placques or the like which may have holes formed therein of any desired shape and of any minimum size without regard to the thickness of the placque.

In accordance with the preferred embodiment of the present invention an ornamental placque is made by providing a large number of very thin plywood sheets each of which consists of a plurality of layers and each of which is stamped or die cut to the desired shape. A plurality of such sheets may then be superimposed one upon another with a suitable adherent between them and adhered together by pressure, with or without heat, thus building up the placque to any desired thickness.

The plywood sheets which are individually stamped or die cut to size are of the laminated type, each sheet consisting preferably of at least three layers or laminations. Three layer plywood is available in sheets or boards of very little thickness, say of the order of ⅛ of an inch or less. The board ⅛ of an inch in thickness consists of three superimposed layers of wood adhered together and with the grain of the different wood layers running in different directions, as is well known in the art of plywood manufacture. In accordance with the principles of the present invention plywood sheets of such thinness are stamped or die cut and then assembled to form a placque. It is apparent that placques can be thus manufactured very cheaply and quickly. Such stamped pieces have clean smooth edges, thus eliminating the need for sanding or the like.

It is further apparent that the manufacture of placques by this method obviates the need of skilled workers and also eliminates the large amount of spoilage normally involved in the cutting of individual placques by jig saws or the like.

The attainment of the above and further objects of the present invention will be apparent from the following specification taken in conjunction with the accompanying drawing forming a part thereof.

In the drawing:

Figure 1 is a placque constructed in accordance with the principles of the present invention;

Figure 2 is a transverse section taken along the line 2—2 of Figure 1; and

Figures 3 and 4 are views illustrating the manner of making the placque of Figure 1.

Reference may now be had more particularly to the drawings. In Figure 1 there is shown a front view of a placque constructed in accordance with the present invention. This placque consists of a flat board 1 consisting of a plurality of pieces of plywood 2—3—4 of identical construction superimposed and adhered together. The placque has an irregular curved outline, indicated at 5, having indentations such as indicated at 6. In the face of the placque there are cut-out portions that extend entirely through the placque and may be of any desired shape. For instance, at 7 there is shown a small circular opening that extends through the placque and may be provided for facilitating hanging of the placque. At 8 there is shown an arbitrary ornamental figure cut through the wood to provide an irregularly shaped hole in the wood, which hole may be of any desired shape and follow any desired regular or irregular contour as required for artistic or ornamental purposes.

Heretofore a placque of the type illustrated in Figure 1 was generally manufactured by providing a piece of wood of the desired thickness, and then by means of a jig saw or the like cutting that piece of wood along the desired pattern. Each placque was thus individually hand made and therefore subject not only to the usual variations resulting from differences in the action of the operator, but also was quite costly. In accordance with the present invention the placque such as is shown in Figure 1 is made by a process which lends itself to quantity machine production at low cost and whereby successively made placques are of identical construction.

Figures 3 and 4 show a method of making the placque of Figure 1. In accordance with the principles of the present invention the placque of Figure 1 is made from stock material comprising plywood board, which is exceedingly thin. A piece of flat plywood board of a thickness 3/32 of an inch or less is provided. This board consists of two or more, in this instance three, layers of wood which are superimposed with the grain of adjacent layers running in different directions, the superimposed layers or plies being then adhered together in manners known in the art to provide a thin plywood board. The stock material being very thin, may then be fed to an ordinary die cutter which by a single punching or stamping operation cuts out an entire design such as is seen in Figure 1. This is possible with very thin plywood where it would not be possible with a thick piece of ordinary wood. Notwithstanding the fact that the plywood is cut in some instances to provide sharp angles, there is no tendency for the wood to shred or become separated along the grain at the corners. This is due to the fact that the grain of the wood in adjacent superimposed layers of wood runs in opposite directions and the layers being adhered together the material in one layer tends to hold the wood of an adjacent layer against shredding or splitting. In view of the fact that the sheet of plywood is very thin it is possible to die cut or stamp the wood along sharp lines of cut. The cut surfaces are smooth and do not require sanding even though a very smooth cut surface is desired.

After the pieces have been cut a number of such pieces, indicated at 2, 3 and 4, are superimposed one upon another with their corresponding die cuts in alignment, as by use of a suitable jig. The number of pieces thus superimposed is determined entirely by the required thickness of the placque. Between adjacent layers of plywood 2, 3 and 4 there is applied a coat or layer of an adhesive material. The preferred material is a phenolic resin type cement, although other materials may be used. These assembled pieces 2, 3 and 4 may then, optionally, be placed in a clamp 20, as illustrated in Figure 4, and cured or set by subjecting it to a temperature of 300° F. to 350° F. for about fifteen minutes. This causes the layers to unite into a solid mass. If desired the cut pieces of plywood may be adhered together without the application of heat thereto.

From the above description it is apparent that I have provided a laminated plywood structure which may be made of any desired thickness and wherein the individual parts are die cut to the desired shape. In this construction the minimum dimensions of the holes cut in the material are not determined by the thickness of the material and it is thus possible to have a placque or the like formed with a hole or holes therein each of which is of a diameter substantially less than the thickness of the material, and this even though the material is made by a die punching operation.

In compliance with the requirements of the patent statutes I have here shown and described a preferred embodiment of my invention. It is, however, to be understood that the invention is not limited to the precise construction here shown, the same being merely illustrative of the principles of the invention.

What is considered new and desired to be secured by Letters Patent is:

1. The method of making an ornamentally cut flat piece which comprises providing flat comparatively thin plywood stock which is of a plurality of adhered laminations of wood with the grain of adjacent laminations angularly disposed, die cutting said stock to provide a plurality of identical pieces in each of which thin pieces the adherence of the angularly disposed grain of the wood of adjacent layers holds the wood against shredding of the cut edges, superimposing a plurality of such die cut pieces of plywood with their corresponding die cut edges in alignment and placing an adherent between the superimposed pieces and applying pressure thereto and thus adhering a plurality of identical thin stamped plywood pieces into one thick piece.

2. The method of making an ornamentally cut flat wooden piece which comprises providing flat comparatively thin plywood stock, die cutting said stock along irregular lines to form a plurality of identical pieces in each of which the grain of the wood running in different directions in adjacent layers holds the wood against shredding, and adhering a plurality of such die cut pieces together in superimposed position with the corresponding die cut edges in alignment.

FRANK RAFFLES.

REFERENCES CITED

The following references are of record in the file of this patent:

UNITED STATES PATENTS

| Number | Name | Date |
| --- | --- | --- |
| 2,286,068 | Deskey | June 9, 1942 |
| 1,365,835 | Lepere | Jan. 18, 1921 |
| 1,984,854 | Ward | Dec. 18, 1934 |
| 2,006,990 | Frid | July 2, 1935 |
| 218,011 | Gardner | July 29, 1879 |
| 2,365,334 | De Vries | Dec. 19, 1944 |